United States Patent Office 3,457,204
Patented July 22, 1969

3,457,204
SELF-EXTINGUISHING THERMOPLASTIC
COMPOSITIONS
Heinz Burger, Ludwigshafen (Rhine), Guenther Daumiller, Ziegelhausen, Johannes Grohmann, Ludwigshafen (Rhine), Ernst-Guenther Kastning, Assenheim, Pfalz, and Heinz Weber and Herbert Willersinn, Ludwigshafen (Rhine), Germany, assignors to Badische Anilin- & Soda-Fabrik, Aktiengesellschaft, Ludwigshafen (Rhine), Germany
No Drawing. Filed July 8, 1966, Ser. No. 563,713
Claims priority, application Germany, July 9, 1965, B 82,751
Int. Cl. C08f 31/04, 47/08
U.S. Cl. 260—2.5                                6 Claims

ABSTRACT OF THE DISCLOSURE

Self-extinguishing composition of polystyrene polymer containing at least 50% styrene, 0.1 to 5% of an organic bromide, and 0.01 to 5% by weight of styrene polymer of a polymer obtained by dehydropolymerization of an araliphatic compound of the benzene series having at least two radicals

wherein $R^7$ is an n-lower alkyl and $R^8$ is an n-lower alkyl.

This invention relates to self-extinguishing thermoplastic compositions containing styrene polymers and organic bromides.

The term "self-extinguishing" as employed herein in respect of thermoplastic compositions means that moldings prepared from such compositions are incapable of supporting a flame for more than 20 seconds after they have been held in an open flame, ignited and then removed from the flame with a gentle movement.

It is known that compounds containing halogen can be used as fire-retarding agents for self-extinguishing thermoplastic polymers. In order to render the polymer, e.g. a styrene polymer, self-extinguishing or non-flammable it is necessary to incorporate relatively large amounts of organic halides. Many of the properties of the polymers, e.g. the tensile strength, impact strength and heat distortion temperature of the polymers, are however thereby deleteriously affected.

It is also known that the fire-retarding effect of organic halides dispersed in the polymers can be enhanced by additives so that adequate fire-retarding action can be achieved by much smaller amounts of these substances. Thus it is possible to improve the fire-retarding action of organic bromides by admixing organic peroxides. Organic peroxides have the disadvantage however that they are toxic and sometimes readily decompose explosively. Susceptible persons handling such peroxides may contract dermatosis. Moreover expensive and troublesome precautions must be taken in handling peroxides to avoid explosions. It is also known that peroxides slowly decompose even at room temperature so that polymer compositions containing organic bromides and peroxides may lose their self-extinguishing characteristics in storage. Furthermore the mechanical properties of polymer compositions containing peroxides undergo gradual deterioration by degradation of the polymer chains.

It is an object of the present invention to provide self-extinguishing thermoplastic compositions comprising styrene polymers and organic bromides which do not have the disadvantages of the prior art compositions.

Another object of the present invention is to provide self-extinguishing or non-flammable thermoplastic compositions comprising styrene polymers and organic bromides in which the content of organic bromides is substantially smaller than that conventionally required for flame-proofing the same polymer with the same organic bromide to the same degree.

A further object is to provide self-extinguishing thermoplastic compositions which can be handled without special precautions.

A still further object of the invention is to provide improved molding materials which may be used for the production of self-extinguishing moldings and contain a styrene polymer and an organic bromide as flame-proofing agent. Yet another object is to provide improved normally solid thermoplastic polymer compositions capable of being foamed to form self-extinguishing cellular articles and comprising a styrene polymer, an organic bromide and a volatile organic compound as foaming agent.

In accordance with the invention, improved self-extinguishing and/or flame-retardant styrene polymers are provided which contain the organic bromide in combination with 0.01 to 5% by weight on the styrene polymers of a polymer prepared from at least one compound having the general formula:

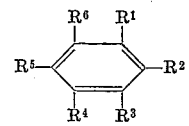

wherein $R^1$, $R^2$, $R^4$ and $R^5$ are identical or different and denote hydrogen atoms, halogen atoms, preferably chlorine or bromine atoms, or aliphatic hydrocarbon radicals having 1 to 4 carbon atoms, at least two of the said substituents denoting the radical

where $R^7$ is a linear alkyl (n-alkyl) radical having 1 to 4 carbon atoms and $R^8$ is a hydrogen atom or a linear alkyl (n-alkyl) radical having 1 to 4 carbon atoms, $R^3$ and $R^6$ denote hydrogen atoms or halogen atoms, preferably chlorine or bromine atoms, or a polymer prepared from a mixture essentially consisting of at least one of the compounds of the formula given above and at least one other compound having the formula

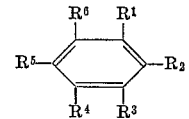

wherein $R^1$ denotes the radical

where $R^7$ and $R^8$ have the meanings given above and $R^2$, $R^3$, $R^4$, $R^5$ and $R^6$ are identical or different radicals and denote hydrogen or halogen atoms, preferably chlorine or bromine atoms.

Polymers of the above-mentioned aliphatic-aromatic hydrocarbons or halohydrocarbons enhance the flame-proofing effect of the organic bromides and will hereinafter be referred to as synergistic polymers.

Polymers of the above-mentioned compounds are preferably prepared by dehydropolymerization, i.e. by poly-recombination reactions as described by V. V. Korshak et al. in "Polymer Science U.S.S.R.," vol. 1 (1960), pp. 341 to 350 and vol. 3 (1962), pp. 925 to 935, in Houben-Weyl, "Methoden der Organischen Chemie," vol. XIV/2, 4th ed., pp. 623–629 (1963), as well as in the literature there cited. Dehydropolymerization or polyrecombination of araliphatic and haloaraliphatic hydrocarbons of the benzene series having usually from 10 to 26 carbon atoms and at least two —CHR⁷R⁸ groups, preferably at least 2 isopropyl groups, can be carried out by treating these compounds at elevated temperature, preferably at a temperature of about 120° to 230° C., with compounds supplying free radicals, such as peroxides, e.g. tert.-butyl peroxide, dibenzoyl peroxide or diacetyl peroxide, oxygen or other oxidizing agents.

The polymer chain growth process occurring in the dehydropolymerization or polyrecombination may be represented as follows:

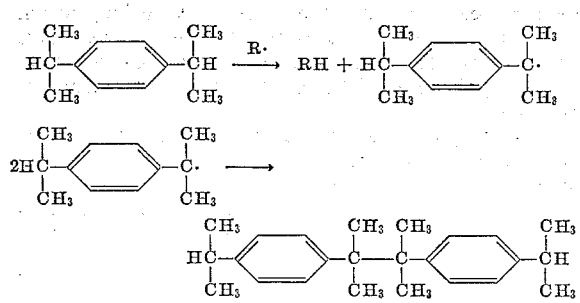

etc.

Monofunctional araliphatic hydrocarbons such as isopropylbenzene which may be added act as molecular weight and chain length regulating agents. The polymers obtained by these conventional reactions usually contain from 3 to about 200 monomer units in chemically combined form, i.e. 3 to about 200 benzene nuclei in the molecule.

The polymers used according to this invention contain repeating units of the formula:

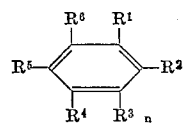

wherein $R^1$, $R^2$, $R^4$ and $R^5$ are identical or different and denote hydrogen atoms, halogen atoms, aliphatic hydrocarbon radicals having 1 to 4 carbon atoms or radicals

at least two of said substituents denoting radicals

wherein $R^7$ is an n-alkyl radical having 1 to 4 carbon atoms and $R^8$ is a hydrogen atom or an n-alkyl radical having 1 to 4 carbon atoms, and $R^3$ and $R^6$ denote hydrogen atoms or halogen atoms, preferably chlorine atoms.

The polymers preferably consist essentially of the said repeating units.

Taking polymers of p-diisopropylenebenzene as an example, the synergistic polymers to be used according to this invention have the formula.

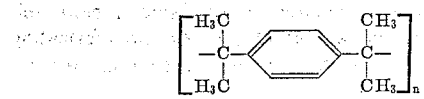

in which $n$ is at least 3 and usually not more than 200.

Examples of suitable polymers are those which have been prepared from the following compounds: p-diisopropylbenzene, m-diisopropylbenzene, 1,2,4-triisopropylbenzene, 1, 2, 3, 5-tetraisopropylbenzene, 1,4-diisopropyl-2-tertiarybutylbenzene, 1,4-die-(2-butylethyl)-benzene, 1,4-diisopropyl-2,5-dimethylbenzene and 1,4-diisopropyl-2,5-chlorobenzene. The polymers may also be prepared from two or more of these compounds.

Polymers which have been prepared from mixtures of one of the said compounds and an aromatic compound having one —CHR⁷R⁸—group are also suitable. Polymers for example of p-diisopropylbenzene and isopropylbenzene have the general formula:

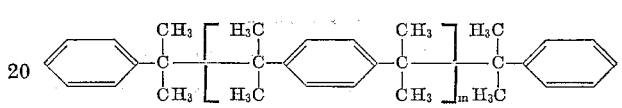

in which $m$ is at least 1 and usually not more than 200.

The polymers may be of linear chain structure and therefore soluble and fusible. Polymers of this type are preferred. The polymers may also be crosslinked. It is then advantageous to use them in finely powdered form.

Another possibility of producing the polymers is by the Wurtz-Fittig reaction of appropriate halogen-substituted compounds having the above general formula.

The synergistic polymers are incorporated in an amount of from 0.01 to 5%, preferably from 0.02 to 2% by weight, on the styrene polymers in the composition.

The term "styrene polymer" as used in the present specification means a normally solid polymer of unsubstituted styrene or a substituted styrene having the formula $$Ar-CH=CH_2$$

wherein Ar represents an aromatic hydrocarbon radical. Examples of substituted styrenes are vinyltoluene, vinylxylene, isopropenylstyrene, tert.-butylstyrene, α-methylstyrene and mixtures of these monomers with one another and/or with styrene. Styrene itself is preferred.

The styrene polymers comprise in chemically combined form at least 50% and preferably at least 70% by weight of one of the styrenes. The term "styrene polymer" includes well-known addition copolymers of styrene or substituted styrenes wtih less than 50% and preferably less than 30% by weight of at least one other readily polymerizable olefinically unsaturated compound having the group $CH_2=C<$, such as α-methylstyrene, methacrylonitrile, acrylonitrile, esters of acrylic or methacrylic acid and alkanols having 1 to 8 carbon atoms, vinylpyridine, N-vinylcarbazole and butadiene. Examples of suitable copolymers are copolymers of 70 to 80% by weight of styrene and 20 to 30% by weight of acrylonitrile, 70 to 80% by weight of styrene and 20 to 30% by weight of α-methylstyrene, 75 to 85% by weight of styrene and 15 to 25% by weight of methyl methacrylate, or 90 to 95% by weight of vinyltoluene and 5 to 10% by weight of vinylpyridine. Copolymers of styrene which contain from 0.001 to 1.0% and preferably from 0.01 to 0.1% by weight of divinylbenzene units may also be used for the purposes of this invention.

The term "styrene polymer" also includes impact-resistant grades as prepared by mixing polystyrene or any of the said styrene copolymers with minor amounts, e.g. 2 to 15% by weight on the styrene polymers of elastomeric polymers such as natural or synthetic rubber or elastomeric polymers of esters of acrylic or methacrylic acid wih alkanols having 4 to 8 carbon atoms. The impact-resistant styrene polymers may also be prepared by polymerizing styrene or a mixture of at least 50% and preferably 70% by weight of styrene and another olefinically unsaturated monomer as mentioned above in the presence of 2 to 10% by weight on the monomers of a finely divided elastomeric polymer such as natural or synthetic rubber.

The organic bromides used are those conventionally employed as flame-proofing agents. They preferably contain at least four carbon atoms and have a plurality (at least two) of bromine atoms attached to the carbon atoms. The bromine atoms should make up more than 40% by weight of the organic bromide.

Those organic bromides are particularly suitable which are not volatile, which have little or no plasticizing action on the styrene polymers and which have no troublesome odor. Organic bromides containing a plurality of bromine atoms in an aliphatic or cycloaliphatic radical are very suitable. In these organic bromides the bromine atoms are preferably attached to adjacent or vicinal carbon atoms in the aliphatic or cycloaliphatic radical. Examples of suitable organic bromides are bromosubstituted alkanes such as 1,2,3,4-tetrabromobutane, 1,2,4-tribromobutane or tetrabromopentane, bromo-substituted cycloalkanes such as tribromotrichlorocyclohexane, tetrabromodichlorocyclohexane, pentabromomonochlorocyclohexane, hexabromocyclohexane, 1,2,5,6,9,10-hexabromocyclododecane or octabromohexadecane, and also dibromoethylbenzene, 1,2-di-(dibromomethyl)-benzene and pentabromodiphenyl ether, esters and acetals of dibromopropanol, such as tris-(2,3-dibromopropyl)-phosphate and esters of bromoalkanoic acids such as methyl $\alpha,\beta$-dibromopropionate. Bromination products of linear and cyclic oligomers or polymers of butadiene or isoprene, such as hexabromocyclododecane and octabromohexadecane, or brominated natural or synthetic rubber are especially suitable.

The minimum amount of organic bromide to be contained in the composition depends upon the nature of the organic bromide and the styrene polymer. The organic bromides are used in such amounts that the compositions or molding materials have a bromine content of at least 0.1% by weight and as a rule not more than 5% by weight, preferably 0.5 to 3% by weight. Usually, the amount of organic bromide used is substantially smaller than is required to render the polymer non-flammable or self-extinguishing if the organic bromide is used alone. If the organic bromide is employed in an amount sufficient to render the polymer self-extinguishing, the compositions are flameproofed more effectively by incorporating a polymer (c) according to this invention.

The compositions may be mixed with additives, for example fillers, pigments, lubricants, plasticizers, antistatics, aging retardants, stabilizers or compounds which promote expansion.

The compositions or molding materials may be in finely divided form, for example in the form of beads or cylindrical granules or in the form of lumps such as are obtained by grinding bulk polymers. The particles advantageously have a diameter of 0.1 to 6 mm., preferably about 0.4 to 4 mm.

The molding materials may be processed, for example by injection molding or extrusion, into self-extinguishing moldings or profiles. Because of their relatively low content of organic bromides the molding materials according to this invention have softening points which differ only slightly from those of the styrene polymers contained therein.

Compositions or molding materials according to this invention which are capable of being foamed to form self-extinguishing expanded articles are of particular interest. They contain, besides a styrene polymer, an organic bromide and a synergistic polymer, also a volatile organic compound as foaming agent. Preferred foaming agents are liquid or gaseous organic compounds which no not dissolve the styrene polymer and whose boiling point is below the softening point of the polymer, for example saturated aliphatic or cycloaliphatic hydrocarbons containing 3 to 7 carbon atoms in the molecule, such as propane, butane, pentane, hexane, heptane, cyclohexane or petroleum ether, or halohydrocarbons, preferably chlorohydrocarbons or fluorohydrocarbons having 1 to 6 and particularly 1 to 4 carbon atoms, such as methyl chloride, dichlorodifluoromethane or 1,2,2-trifluoro-1.1,2-trichloroethane. Mixtures of two or more of the said agents may also be used. Very suitable foaming agents have a molecular weight of at least 58 and a boiling temperature below 95° C. at 760 mm. pressure. The amount of foaming agent must be sufficient to provide enough vapor to expand the polymer to an article of cellular structure. It is advantageous to use 3 to 10% by weight of foaming agent on the styrene polymer.

Self-extinguishing foamed articles are obtained from such expandable compositions or molding materials for example when fine particles of these materials are heated in a gas-permeable mold to a temperature above the softening point of the styrene polymer contained in the composition so that the particles expand and fuse together into a molding. The expandable molding material may also be processed into foam sheet by means of extruders.

To prepare self-extinguishing foam sheet, the components of the compositions or molding materials may be mixed with a foaming agent. Mixing is advantageously carried out in continuous equipment, for example in an extruder. Temperatures are used which are above the softening point of the polymer. The mixture should be kept under a pressure which is at least equal to that of the pressure produced by the foaming agent to avoid the mixture expanding during mixing or during heating to a temperature above its softening point. The expression "pressure produced by the foaming agent" is to be understood as the pressure which is set up at the temperature used. If an organic liquid or a gaseous compound which is below the critical pressure is used as foaming agent, the pressure of the foaming agent corresponds to the vapor pressure of the foaming agent which is set up above the mixture of styrene polymer and expanding agent.

The mixture is extruded into a zone of lower pressure. The pressure in this zone should be lower than the pressure of the foaming agent at the prevailing temperature so that the mixture expands. In most cases it is expedient to extrude the mixtures into a zone which is at atmospheric pressure. It may sometimes be advantageous to use a pressure below atmospheric.

To prepare the compositions or molding materials, the synergistic polymer and the organic bromides can be incorporated with the styrene polymer, with or without other components, by any method which ensures homogeneous distribution of the agents in the polymer and does not cause appreciable deterioration or decomposition of any of the components. Incorporation with the styrene polymer may for example be effected on rollers, in an extruder or in a kneader. It is also possible, for example in the production of cast film, to add to the synergistic polymer and the organic bromide a solution of the styrene polymer in a solvent, preferably a volatile solvent, such as benzene, acetone or dioxane, and then to evaporate the solvent.

In many cases the synergistic polymer and the organic bromide can be added to the monomeric components of the styrene polymers.

It is a particular advantage that the synergistic polymer does not interfere with polymerization of the styrene. To prepare the compositions or molding materials according to this invention, the monomeric components of the styrene polymers can therefore be polymerized in the presence of the synergistic polymers and the organic bromides with or without a foaming agent. By this method a particularly homogeneous dispersion of the organic bromide and tht synergistic polymer in the styrene polymer is obtained. The styrene and the comonomer mixed with an organic bromide, a synergistic polymer and preferably a foaming agent may be polymerized in bulk, i.e. in the absence or substantial absence of an inert diluent or solvent for the styrene polymer, or advantageously suspended in an inert liquid medium, e.g. at temperatures between 65 and 130° C. and in the presence of a peroxide catalyst such as benzoyl peroxide, acetyl peroxide or hydrogen peroxide.

The synergistic polymer has the advantage that it is safe to handle unlike other conventional compounds which increase the flame-proofing effect of the organic bromides. It has been found moreover that the self-extinguishing property is not lost even after prolonged storage at high temperatures. It is however a particular advantage that the synergistic polymers do not act as plasticizers for the styrene polymer and are not volatile. Furthermore the materials do not involve any health hazard.

The self-extinguishing property of moldings prepared from compositions according to this invention can be tested as follows: to test unexpanded materials, moldings having the dimensions 0.1 x 10 x 30 cm., and for testing expanded materials, moldings having the dimensions 0.5 x 15 x 40 cm. are held for five seconds in a gas flame having a height of 40 mm. and the flame is then removed with a gentle movement. The extinction time (in seconds) of the molding after it has been removed from the flame is a measure of its self-extinguishing characteristics. Untreated or inadequately treated molding materials burn away completely after they have been removed from the flame.

The invention is further illustrated in the following examples in which parts and percentages are by weight. In the methods described in the examples, the following synergistic polymers (synergists) are used:

| | Method of production | |
|---|---|---|
| Synergist: | | |
| a | Prepared from p-diisopropylbenzene according to Korshak (peroxide). | Whole substance. |
| b | do | Benzene-soluble portion. |
| c | do | Benzene-insoluble portion. |
| d | Prepared by reaction of p-diisopropylbenzene with atmospheric oxygen. | Benzene-soluble portion. |
| e | Prepared from m-diisopropylbenzene according to Korshak (peroxide). | Heptane-insoluble portion. |
| f | do | Heptane-soluble portion. |
| g | Prepared from 1,2,4-triisopropylbenzene according to Korshak (peroxide). | Whole substance. |
| h | Prepared from 1,2,4,5-tetraisopropylbenzene according to Korshak (peroxide). | Do. |
| i | Prepared from 1,4-diisopropyl-2,5-dichlorobenzene according to Korshak (peroxide). | Do. |
| k | Prepared from 4 moles of p-diisopropylbenzene and 1 mole of isopropylbenzene. | Do. |

EXAMPLE 1

In each case 30 parts of a styrene polymer and specific amounts of an organic bromide and a synergist are dissolved in 100 parts of methylene chloride. 3 parts of pentane is added to the solution. The solution is then poured onto a sheet of glass and the methylene chloride is allowed to evaporate at room temperature. The pentane remains homogeneously dispersed in the mixture. The film thus obtained is foamed in steam at 100° C. and dried in vacuo at 35° C. for ten minutes. The resultant foam sheet is tested by the above method for its self-extinguishing characteristics. The results are given in the table:

SP=styrene polymer; OB=organic bromide in percent; ST=type of synergist; S%=percentage of synergist; ET=extinction time in seconds; HBCD=hexabromocyclododecane; TDBP=tris-(2,3-dibromopropyl) phosphate.

| SP | OB | ST | S% | ET |
|---|---|---|---|---|
| Polystyrene | HBCD | | | |
| | 1.0 | | | 11.0 |
| | 1.25 | | | 9.0 |
| | 1.0 | a | 0.05 | 2.7 |
| | 1.0 | a | 0.1 | 2.3 |
| | 1.0 | a | 0.1 | 2.3 |
| | 1.0 | a | 0.5 | 1.0 |
| | 1.25 | a | 0.1 | 1.0 |
| | 1.25 | a | 0.5 | 0.7 |
| | 1.0 | b | 0.2 | 2.0 |
| | 1.0 | b | 0.5 | 1.5 |
| | 1.0 | c | 0.1 | 4.0 |
| | 1.0 | c | 0.5 | 1.0 |
| | 1.0 | d | 0.1 | 3.2 |
| | 1.0 | d | 0.5 | 1.7 |
| | 1.25 | d | 0.1 | 2.0 |
| | 1.25 | d | 0.5 | 1.3 |
| | 1.0 | e | 0.5 | 3.5 |
| | 1.0 | f | 0.1 | 4.1 |
| | 1.0 | f | 0.5 | 2.7 |
| | 1.0 | g | 0.5 | 1.7 |
| | 1.0 | h | 0.1 | 4.1 |
| | 1.0 | i | 0.1 | 4.6 |
| | 1.0 | k | 0.5 | 1.8 |
| Polystyrene | TDBP | | | |
| | 1.0 | | | (¹) |
| | 1.0 | a | 0.5 | 7.0 |
| Copolymer of 75% by weight of styrene and 25% by weight of acrylonitrile. | HBCD | | | |
| | 1.0 | | | 12 |
| | 1.0 | a | 0.3 | 3.5 |
| | 1.0 | a | 0.5 | 2.8 |

¹ More than 20.

Similar results are obtained by using, instead of the said copolymer of 75% by weight of styrene and 25% by weight of acrylonitrile, a mixture of 100 parts of this copolymer and 5 parts of polybutadiene.

EXAMPLE 2

In each case a mixture of 100 parts of a styrene polymer (obtained by polymerization of 95 parts of styrene in the presence of 5 parts of polybutadiene), 1.5 parts of hexabromocyclododecane and 0.1or 0.5 part of synergist (a) is extruded to sheeting having a thickness of 1 mm. by means of an extruder having a sheeting die.

The sheeting obtained is tested for its self-extinguishing characteristics. The sheeting containing 0.1% of synergist (a) is self-extinguished 2.9 seconds after removal from the flame and the sheeting containing 0.5% of synergist (a) 1.0 second after removal from the flame.

Sheeting which contains the same amount of hexabromocyclododecane, but no synergist (a), burns away completely when tested in the same way.

EXAMPLE 3

In a double screw extruder (L:D ratio 25) an attachment for forcing in liquid is provided in about the first third of the barrel. A mixture of 100 parts of polystyrene, 1.5 parts of hexabromocyclododecane, 0.3 part of synergist (d) and 1 part of kaolin is fed into the feed hopper of the extruder. The temperature in the melting zone is 180° C. In the following mixing zone, methyl chloride is forced in continuously through the attachment at such a rate that the mixture leaving the die contains about 10% of methyl chloride on the polystyrene. The temperature in the mixing zone is 160° C. In the following cooling zone, the mixture is cooled to such an extent that the mixture leaving the die has a temperature of 110° C. The strand leaving the die expands. The resultant foam strand has a density of about 40 g./l.

A test specimen containing 1.5 parts of hexabromocyclododecane ceases to burn after 5.5 seconds, If 0.3 part of synergist (d) be mixed with the 1.5 parts of hexabromododecane, the flame ceases to burn after less than half a second.

EXAMPLE 4

0.64 part of polyvinylpyrrolidone having a K value of 90 (as protective colloid) and 0.4 part of sodium pyrophosphate are dissolved in 400 parts of water in a stirred vessel. 200 parts of styrene (in which 14 parts of styrene, 0.75 part of benzoyl peroxide, 3 parts of hexabromocyclododecane and 0.4 part of synergist (d) have been dissolved) is added thereto. The whole is heated to 70° C. during twenty hours while stirring and kept at 85° C. for another fifteen hours. The resultant polystyrene containing expanding agent is separated, washed and dried. Pre-expanded particles obtained by exposing them to the action of steam are processed with steam on the following day in molds into blocks of expanded polystyrene. Foam sheets 1.5 cm. in thickness are cut from these blocks by means of an electrically heated wire. These are kept for several days at room temperature and trued up to about 30 x 40 cm.

Sheets thus prepared are held with their 1.5 cm. edge in a luminous gas flame 40 mm. in length, removed therefrom with a gentle movement and the time until they cease to burn is measured. The average of ten measurements is 1.5 seconds.

When following the same procedure but without adding synergist (d), the flame does not cease to burn until after 5.4 seconds.

We claim:

1. An improved self-extinguishing composition consisting essentially of
   (a) a normally solid thermoplastic styrene polymer containing in chemically combined form at least 50% of styrene and having intimately incorporated therewith
   (b) an organic bromide having a plurality of bromine atoms attached to the carbon atoms, said bromine atoms constituting more than 40% by weight of said organic bromide, in such an amount that said composition has a bromine content from 0.1 to 5% by weight, and
   (c) from 0.01 to 5% by weight of said styrene polymer of a polymer obtained by dehydropolymerization of at least one araliphatic compound of the benzene series selected from the group consisting of a compound having the formula

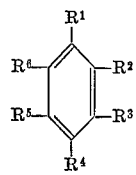

wherein $R^1$, $R^2$, $R^4$ and $R^5$ are members selected from the group consisting of a hydrogen atom, a halogen atom and an aliphatic hydrocarbon radical having 1 to 4 carbon atoms, at least two of said substituents being radicals

where $R^7$ is an n-alkyl radical having 1 to 4 carbon atoms and $R^8$ an n-alkyl radical having 1 to 4 carbon atoms; $R^3$ and $R^6$ are members selected from the group consisting of a hydrogen atom and a halogen atom; and a mixture of at least one of said compounds and a compound of said formula wherein $R^1$ is the radical

where $R^7$ and $R^8$ have the meanings given above and $R^2$, $R^3$, $R^4$, $R^5$ and $R^6$ are members selected from the group consisting of a hydrogen atom and a halogen atom, said polymer having 3 to about 200 benzene nuclei in the polymer chain and said dehydropolymerization occurring at the carbons to which the radicals $R^7$ and $R^8$ are attached.

2. An improved self-extinguishing composition as claimed in claim 1 wherein the organic bromide contains at least four carbon atoms and a plurality of bromine atoms attached to a radical selected from the group consisting of an aliphatic radical and a cycloaliphatic radical, said bromine atoms constituting more than 40% by weight of said organic bromide.

3. An improved self-extinguishing composition as claimed in claim 1 wherein the styrene polymer is a normally solid thermoplastic addition copolymer of at least 50% by weight of styrene and less than 50% by weight of another readily polymerizable olefinically unsaturated compound selected from the group consisting of acrylonitrile, methacrylonitrile, α-methylstyrene, esters of acrylic and methacrylic acid and alkanols having 1 to 8 carbon atoms, vinylpyridine, N-vinylcarbazole and butadiene.

4. An improved self-extinguishing composition as claimed in claim 1 wherein the styrene polymer is a styrene homopolymer.

5. An improved self-extinguishing composition as claimed in claim 1 which contains as a foaming agent 3 to 10% by weight on said styrene polymer of a volatile organic compound which does not dissolve said styrene polymer, has a boiling temperature below 95° C. at 760 mm. pressure and is selected from the group consisting of aliphatic and cycloaliphatic hydrocarbons, chlorohydrocarbons and fluorohydrocarbons.

6. An improved self-extinguishing composition as claimed in claim 1 wherein polymer (c) is prepared by dehydropolymerization of a diisopropylbenzene.

References Cited

UNITED STATES PATENTS 3,058,926 10/1962 Eichhorn.
3,338,864 8/1967 Mageli et al.
3,361,687 1/1968 Stahnecker.

MURRAY TILLMAN, Primary Examiner

M. FOELAK, Assistant Examiner

U.S. Cl. X.R.

260—45.7, 2, 874, 898, 880, 895